United States Patent [19]

Baise et al.

[11] 4,371,565
[45] Feb. 1, 1983

[54] PROCESS FOR ADHERING AN ORGANIC RESIN TO A SUBSTRATE BY MEANS OF PLASMA POLYMERIZED PHOSPHINES

[75] Inventors: Arnold I. Baise, Poughkeepsie, N.Y.; John M. Burns, Menlo Park, Calif.; Harbans S. Sachdev, Wappingers Falls, N.Y.

[73] Assignee: International Business Machines Corporation, Armonk, N.Y.

[21] Appl. No.: 299,273

[22] Filed: Sep. 4, 1981

[51] Int. Cl.³ .............................................. B05D 3/06
[52] U.S. Cl. ..................................... 427/41; 204/165; 427/82; 427/248.1; 427/255; 427/255.6; 427/407.1; 427/409
[58] Field of Search .................. 427/41, 45.1, 255, 86, 427/58, 255.6, 240, 299, 384, 407.1, 380.5, 409, 82, 248.1, 327; 204/165; 430/271

[56] References Cited

U.S. PATENT DOCUMENTS

| | | | |
|---|---|---|---|
| 3,387,991 | 6/1968 | Erchak | 427/41 |
| 4,176,003 | 11/1979 | Brower et al. | 430/313 |
| 4,267,212 | 5/1981 | Sakawaki | 427/240 |
| 4,269,931 | 5/1981 | Suzuki et al. | 430/271 |
| 4,283,481 | 8/1981 | Okai et al. | 430/271 |

OTHER PUBLICATIONS

Richard L. Bersin, "How to Obtain Strong Adhesive Bonds via Plasma Treatment" *Adhesives Age,* Mar. 1972, pp. 37-39.

B. D. Washo, "Adhesion of Tetrafluorethylene to Substrate" *IBM Technical Disclosure Bulletin,* vol. 20, No. 12, May 1978, p. 5233.

Cassidy and Yager, "Coupling Agents as Adhesion Promotere" *Journal of Macromolecular Science—Review in Polymer Technology, (1971) pp. 1-50, vol. D-1.*

Primary Examiner—Sadie L. Childs
Attorney, Agent, or Firm—Joseph G. Walsh

[57] ABSTRACT

The adhesion of organic resins to substrate materials is increased by depositing on the substrate a coating of a plasma polymerized unsaturated organophosphine.

5 Claims, No Drawings

PROCESS FOR ADHERING AN ORGANIC RESIN TO A SUBSTRATE BY MEANS OF PLASMA POLYMERIZED PHOSPHINES

TECHNICAL FIELD

The present invention is concerned with increasing the adhesion between organic resins and substrates, particularly such substrates as silicon, silicon dioxide, aluminum and the noble metals.

The present invention provides such increased adhesion by a process in which the substrate is coated with a layer of polymerized organophosphine.

BACKGROUND ART

The use of adhesion promoters is well known in the art. Such use is shown, for example, in "How to Obtain Strong Adhesive Bonds Via Plasma Treatment," Bersin, Adhesives Age, March 1972, pp. 37–39; IBM Technical Disclosure Bulletin, Vol. 20, No. 12, May 1978, "Adhesion of Tetrafluorethylene to Substrate," B. D. Washo, page 5233 and U.S. Pat. No. 4,173,003 to Brower et al., "Method for Enhancing the Adhesion of Photoresist to Polysilicon." The use of phosphorus-containing compounds as adhesion promoters has also been shown in the prior art, namely, Journal of Macromolecular Science—Review in Polymer Technology, (1971) pp. 1–50, Vol. D-1, Cassidy and Yager, "Coupling Agents as Adhesion Promoters."

As far as we are aware, the prior art does not disclose the promotion of adhesion by a polymerization process such as is described in the present invention.

SUMMARY OF THE INVENTION

According to the present invention, the adhesion between an organic resin and a substrate is greatly increased when there is inserted between the two a layer of plasma polymerized unsaturated organophosphine. In the process of the present invention, an unsaturated organophosphine in the vapor state is introduced into a reaction chamber where it is subjected to radio energy. This radio energy may be either of radio frequency (RF) or of microwave frequency. This irradiation results in the plasma polymerization of the unsaturated organophosphine, and the deposition of a film of the polymer onto the substrate. When the substrate has been coated with the film of polymerized organophosphine, it is then coated with the organic resin on top of said film of polymerized organophosphine.

The process of the present invention is particularly useful for substrates which contain the element silicon. These substrates particularly include the element silicon, silicon dioxide and silicon nitride. The invention is also applicable to use with metal substrates. In particular, mention may be made of aluminum, and the noble metal such as rhodium.

In the fabrication of electronic devices it is often desirable to coat substrates such as semiconductors with passivating or insulating coatings of organic resin materials. Many such materials are known in the art. Particularly useful in the process of the present invention are polymethyl methacrylate, especially resist materials based upon polymethyl methacrylate, and the thermosetting polyphenylene resin known by the Hercules Trademark of H-resin. In the past, however, it has often been difficult to obtain good adhesion between such coatings and the substrate.

In practicing the process of the present invention, an unsaturated organophosphine material is used. The preferred material is trivinylphosphine. Other useful materials include divinylphenylphosphine, vinyldiphenylphosphine and vinyl alkyl phosphines.

In carrying out the invention, it is preferred that the deposited film of polymerized organophosphine having a thickness of from about 400 to about 600 Å units. After deposition of the phosphine polymers, the resin such as H-resin is most desirably applied by spin coating. The spin coating may then be cured by baking, for example, at 350° C. The thickness of the H-resin film is generally on the order of from 1 to 2 microns. When manufactured according to the process of the present invention, such films could not be pulled off semiconductor substrates even in repeated tests. This is in sharp contrast to control samples made without using the present invention, where the films peel off very easily.

The plasma polymerized phosphine has been analyzed by ESCA spectra, which indicates that the polymer has the same stoichiometry as the monomer, and that phosphorus exists in two states (presumably trivalent and pentavalent).

The following example is given solely for the purposes of illustration and is not to be considered a limitation on the invention, many variations of which are possible without departing from the spirit or scope thereof.

PLASMA DEPOSITION OF TRIVINYL PHOSPHINE

Trivinyl phosphine is injected into an evacuated tubular glass reactor to maintain a pressure of 65 nm (without the organic, the pressure is approximately 5 to 10 nm). A chamber (10 inches diameter, 6 inches high) connected downstream to the glass reactor carried a platen (approximately 7 inch diameter) on which are kept the substrate wafers for the adhesion promoter deposition. The platen rotates approximately 8 turns per minute. Glow discharge is maintained by applying RF power 13.5 MHz coupled through a coil around the glass tube reactor. Thickness is monitored by a crystal monitor using a Sloan gauge. The crystal sits about 1 cm above the rotating substrate. The coating is carried out by applying a power of approximately 15 watts. The deposition rate is approximately 30 Å/minute.

We claim:

1. A process for increasing the adhesion of an organic resin material to a metal or silicon containing substrate, said process comprising the steps of:
  (1) providing a vapor of an unsaturated organophosphine,
  (2) introducing said organophosphine vapor into a reaction chamber,
  (3) subjecting said organophosphine vapor to radio energy discharge, so as to deposit a film of polymerized organophosphine on said substrate, and
  (4) applying a coating of an organic resin on top of said film of polymerized organophosphine.

2. A process as claimed in claim 1 wherein the unsaturated organophosphine is trivinylphosphine.

3. A process as claimed in claim 1 wherein the film of polymerized organophosphine is from 400 to 600 Å in thickness.

4. A process as claimed in claim 1 wherein the substrate is silicon, silicon dioxide or silicon nitride.

5. A process as claimed in claim 1 wherein the coating of the organic resin is applied by spin-coating.

* * * * *